United States Patent [19]

Gutterman

[11] Patent Number: 4,527,433
[45] Date of Patent: Jul. 9, 1985

[54] METHOD AND APPARATUS FOR MEASURING FLUID FLOW

[75] Inventor: Jeffrey S. Gutterman, Hilton, N.Y.

[73] Assignee: General Motors Corporation, Detroit, Mich.

[21] Appl. No.: 545,258

[22] Filed: Oct. 25, 1983

[51] Int. Cl.³ .............................................. G01F 1/66
[52] U.S. Cl. .............................. 73/861.28; 73/861.02
[58] Field of Search .......... 73/861.27, 861.28, 861.02, 73/861.03, 597

[56] References Cited

U.S. PATENT DOCUMENTS

| | | | |
|---|---|---|---|
| 2,724,269 | 11/1955 | Kalmus | 73/861.28 |
| 3,555,899 | 1/1971 | Yamamoto et al. | 73/861.29 |
| 3,641,817 | 2/1972 | Dory . | |
| 3,727,458 | 4/1973 | Parkinson . | |
| 3,751,979 | 8/1973 | Ims . | |
| 3,906,791 | 9/1975 | Lynnworth . | |
| 4,011,755 | 3/1977 | Pedersen et al. . | |
| 4,162,630 | 7/1979 | Johnson | 73/861.27 |
| 4,164,865 | 8/1979 | Hall et al. | 73/861.28 |
| 4,308,754 | 1/1982 | Pedersen et al. . | |
| 4,372,166 | 2/1983 | Loveland . | |

FOREIGN PATENT DOCUMENTS 2538788 3/1977 Fed. Rep. of Germany ... 73/861.27

OTHER PUBLICATIONS

K. S. Stull, Jr.–"Ultrasonic Phase Meter" *Electronics,* Sep. 1955, pp. 128–131.

*Primary Examiner*—Charles A. Ruehl
*Attorney, Agent, or Firm*—Warren D. Hill

[57] ABSTRACT

A fluid flow meter and, more especially, an airflow meter having fast response and very high resolution uses piezoelectric transducers operating near resonance to pass ultrasonic signals upstream and downstream alternately in a flow passage. Transmission signals continue longer than the propagation time to the receiver so that the phase of the received signals can be compared to the transmission signals. The difference of upstream and downstream phase differences is a measure of the air velocity while the sum of those phase differences is useful to determine air temperature. These values along with an air pressure sensor reading are combined to determine mass airflow through the passage. The acoustic transducers are operated near resonance to optimize signal-to-noise ratio. Readings from the initial reception period of each transducer are ignored to avoid the effects of ringing of the transducer from each previous transmission cycle and to allow the receive signal to build up resonance with the acoustic signal.

Figure 4:
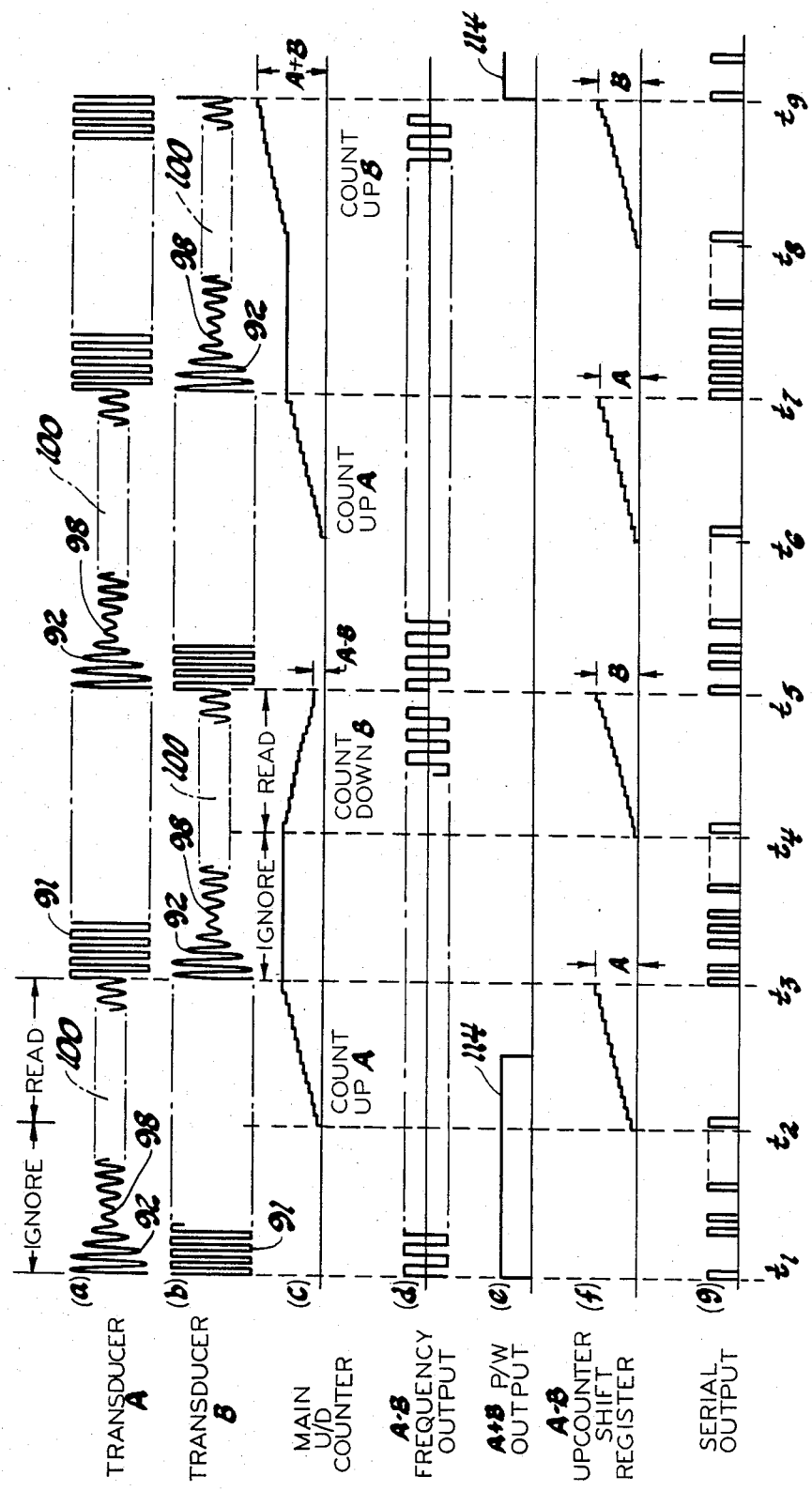

11 Claims, 4 Drawing Figures 4,527,433

METHOD AND APPARATUS FOR MEASURING FLUID FLOW

This invention relates to fluid flow measuring methods and apparatus and more particularly to acoustic fluid flow meters and their method of operation.

For one type of fuel control for automotive engines, it is desirable to measure mass airflow and such measurement must be made with high resolution in a short space and with fast response to any changes in the airflow. In other applications, it is desirable to measure the flow of air or other gases or the flow of liquids to obtain information such as the speed of the fluid or the volumetric rate of flow.

Acoustic flow meters, usually operating in the ultrasonic range, have been proposed for such fluid flow measurements and have exhibited some good qualities which are well suited to such measurements, although they have not been optimized to obtain sufficiently high resolution for many applications.

One common type of such fluid flow meter sends short bursts of acoustic energy from one transducer to another and measures the propagation time upstream and downstream through the fluid. That propagation time forms the basis for calculating the fluid flow. However, measured data points can be collected only slowly because of the inherent propagation time limitation. The result of such sparse data is low resolution. In addition, there is an inherent uncertainty in the time of arrival of the burst of acoustic energy at the receiving transducer. A commom variant of this arrangement is the use of a singaround circuit where the receipt of an acoustic burst by a transducer triggers the emission of another burst so that the frequency of the acoustic signal is a measure of the acoustic propagation time between the transducers. Of course, this suffers from the same low resolution and uncertainty as the former method.

In the above recited and other systems, the transducers are generally piezoelectric crystals and it has been the practice to excite the piezoelectric crystal for acoustic signal transmission by energizing it with a high voltage, typically 300 volts. Such shock excitation is required, particularly, where a rapid burst of acoustic energy is needed and also due to inefficient operation of the transducers a very large signal is required to obtain a good signal-to-noise ratio in the output.

It has been proposed to measure fluid flow by propagating a long train of pulses through the flow path at a given frequency and using a phase locked loop to alter that frequency to maintain an integral number of waves between the transmitting and receiving transducers. The resulting frequency is a measure of the propagation time between the transducers and due to the repetitive sampling of many incoming pulses, good resolution can be obtained provided that a steady state flow is being measured. Due to the inherently long time required for a phase locked loop circuit to lock onto the received signals, the response time of the system is very slow and for many applications, the output information would lag the changes in fluid flow so much that the information would not be useful.

It is an object of this invention to provide a method and an apparatus for acoustic fluid flow measurement characterized by a very high resolution and fast response. It is another object of the invention to provide such a method and apparatus requiring only a low voltage excitation signal to obtain a high signal-to-noise ratio in the output.

The method of the invention is carried out by upstream and downstream acoustic transducers adjacent a flow path and the steps of alternately energizing the transducers with transmission signals having a long pulse train containing many wave lengths in the acoustic path between the transducers to generate a received signal at the other transducer, waiting for a delay period after initial signal transmission to allow the received signal to stabilize, and then measuring the phase difference between the transmission signal and the received signal for both upstream and downstream acoustic signal propagation, where the difference between the upstream and downstream phase differences is a function of fluid flow through the passage.

The method of the invention is further carried out by energizing the transducers by a low voltage at a frequency slightly removed from the resonance peak frequency of each transducer to drive the receiving transducer to a near resonant state to produce a strong received signal and to filter out extraneous non-resonant noise.

The apparatus of the invention is carried out by a pair of acoustic transducers mounted upstream and downstream adjacent a flow passage. A high frequency source for energizing either of the transducers at a frequency sufficient to provide many wave lengths of acoustic energy between the transducers, a cirucit for alternately switching the energizing signal between the transducers to alternate the transducer roles as transmitters and receivers, and means for measuring the phase difference between the transmission and received signals after the received signal has become stabilized following the role switching of the transducers to obtain phase difference values for upstream and downstream propagation. The invention further comprehends circuitry which utilizes the phase difference information to determine therefrom the fluid flow and in the case of mass airflow measurement, incorporates a pressure sensor which supplies pressure information to the circuitry necessary for the mass airflow calculation.

The invention further comprehends using transducers of substantially the same resonant frequency and a source of frequency slightly removed from the resonance peak of the transducers to allow low voltage excitation of the transmitting transducer and a strong response of the receiving transducers.

Figure 1:
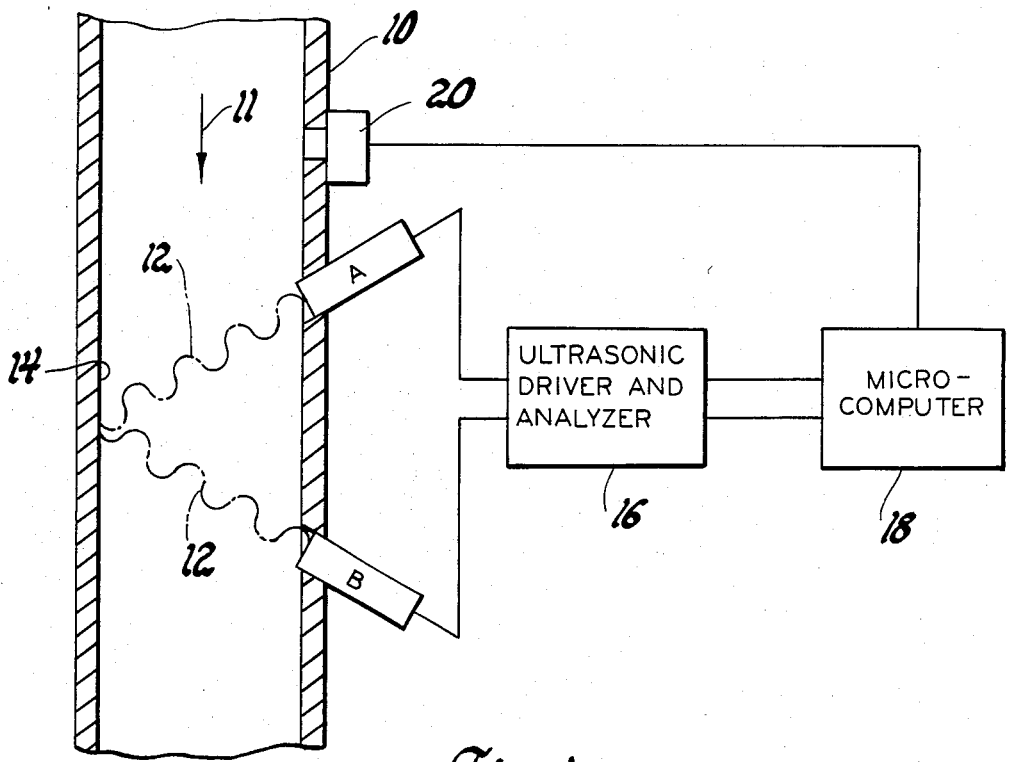
Figure 3:
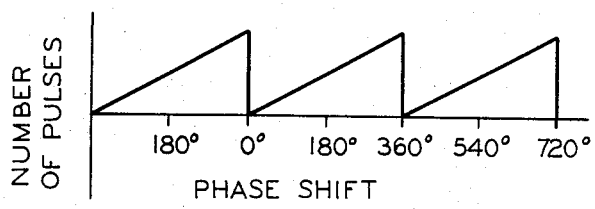
Figure 2:
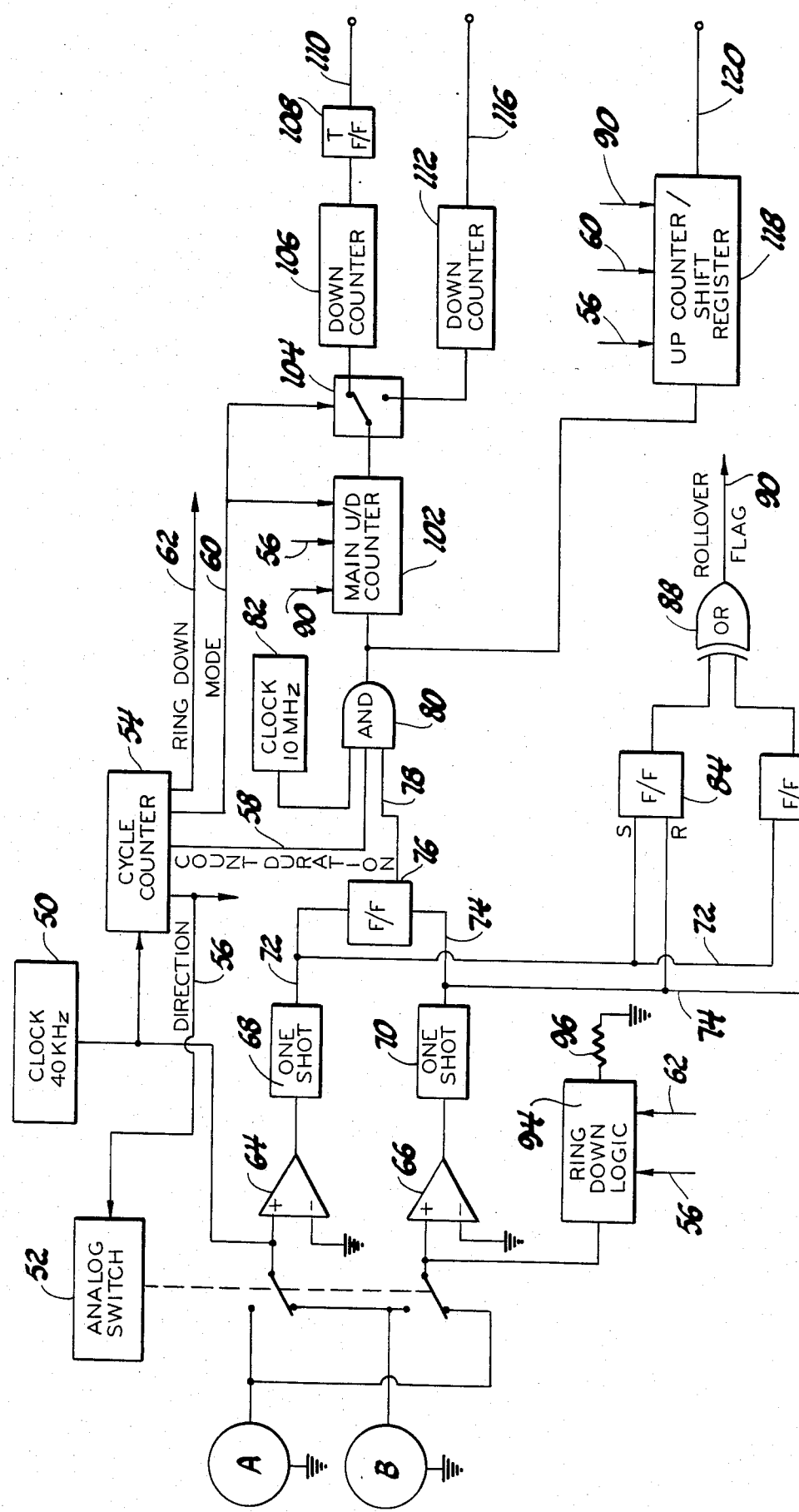

The above and other advantages of the invention will become more apparent from the following description taken in conjunction with the accompanying drawings, wherein:

FIG. 1 is a diagramatic view of a transducer arrangement in a flow passage coupled to circuitry constructed and operated according to the invention, FIG. 2 is a circuit diagram of a portion of the circuit of FIG. 1 according to the invention, FIG. 3 is a graph illustrating the relationship between phase shift and measured value thereof determined by the circuit of FIG. 2, and FIG. 4 is a set of waveforms illustrating operation of the circuit of FIG. 2.

The invention as described herein is applied to the measurement of volumetric airflow or mass airflow in the induction passage of an automotive engine to obtain the necessary data for engine fuel control, which data is required in real time so that any changes of airflow can result in immediate changes of fuel supply to meet rigorous control standards. The principles disclosed herein are not limited to such an application, however, since the fast response and very high resolution offered by this invention have much broader application and includes the flow measurement of gases other than air and the flow measurement of liquids as well.

Referring to FIG. 1, a flow passage 10 contains in its wall a pair of electroacoustic transducers referred to as an upstream transducer A and a downstream transducer B. The terms "upstream" and "downstream" are relative to the arrow 11 indicating the usual flow direction, however, the instrument operates well for flow in either direction. The transducers are angularly positioned within the wall of the passage 10 so that an acoustic wave train 12 emitted from either transducer will, after reflection from a wall region 14, be transmitted to the other transducer. It is not essential that the reflection technique be employed, rather the transducer B, for example, may be located at the wall region 14 so that only a single pass of the wave train 12 occurs across the passage. It is important, however, that the frequency of the acoustic signal be such that many pulses or wavelengths occur along the acoustic path between the transducers. For example, the passage and transducer location may be so designed that nominally 16 wavelengths of the operating acoustic wavetrain be between the transducers and the meter can be calibrated at a given flow rate (preferably zero flow) and temperature so that the transducer separation is exactly 16 wavelengths. Then any changes of flow rate will alter the wavelength so that the effective acoustic path changes by a fractional wavelength for small flow rates and by one or more wavelengths for higher flow rates. The circuit described herein, in effect, measures such wavelength changes to determine flow rate. An ultrasonic driver and analyzer circuit 16 is coupled to each of the transducers A and B to provide transmission signals for energizing the transducers alternately and to receive the output signals from the transducer which is receiving the acoustic energy.

Piezoelectric crystals are used as transducers and since each one acts as transmitter and receiver, they should have the same characteristics. To optimize the efficiency of the transducers, they are chosen with a resonant frequency near the operating frequency. If the resonant frequency is at the operating frequency, the crystals are at their minimum impedance and acoustic signal transmission will be optimized but acoustic signal reception will be minimal. By choosing an operating point slightly spaced in either direction from the resonant point, the crystals will have moderate impedance so that both transmission and reception are good. For example, a crystal having a resonant point at 36 kHz and an antiresonant point at 39 kHz with impedances of 500 ohms and 22,000 ohms, respectively, is preferably operated at about 40 kHz with 7,000 ohms impedance or at 34 kHz with the same impedance. Operating in this manner, a transmitting signal of 10 volts peak-to-peak results in a received signal of 0.5 volts peak-to-peak. Any acoustic noise at frequencies far from the crystal resonance is effectively filtered since the crystal is essentially nonresponsive to such frequencies. In the application to automotive engines, there is very little noise generated in the region of 35 to 40 kHz but there is much noise around 20 kHz which is not sensed by the receiver.

The circuit 16 is shown in detail in FIG. 2 and, as will be described, is capable of not only driving the transducers and receiving signals from them, but also analyzing the signals to determine the phase of the received signal relative to the transmission signal and to provide output signals relaying the phase information to a utilizing circuit 18 which preferably is in the form of a microcomputer programmed to derive from the phase information the desired fluid flow outputs. In the case of engine fuel control, the circuit 18 is an engine control module which is a microcomputer having many inputs other than airflow information for controlling engine operation, particularly the supply of fuel thereto. Since mass airflow is a principle element in the engine control algorithm, the air temperature and pressure are important inputs to the microcomputer. The phase information from the driver and analyzer circuit 16 contains the temperature information as well as the flow information. A separate pressure sensor 20 supplies pressure information to the microcomputer 18.

Referring to FIG. 2, a clock 50 provides an output signal preferably at 40 kHz and the clock output is connected through an analog switch 52 to the transducer A or transducer B according to the switch state. The clock output is also fed to a cycle counter 54 which has several outputs having prescribed periods and prescribed relationships for controlling operations of various aspects of the circuit. A direction output on line 56 preferably occurs once every 256 cycles and is connected to the analog switch 52 to control which transducer is energized with a transmission signal thereby establishing the direction of acoustic signal propagation through the air passage. In this specification, the direction A is used with reference to upstream propagation as measured by the acoustic signals received at the upstream transducer A and direction B refers to downstream propagation. It is preferred that the direction signal change state every 256 clock pulses. Another cycle counter output is count duration on line 58 which preferably changes state near the middle and at the end of the direction pulse and lasts for at least 128 pulses. A mode output on line 60 begins when the upstream direction begins and extends for two direction periods of 512 pulses. A ring down duration pulse on line 62 occurs at each change of the direction signal and extends for about 16 pulses.

The clock 50 output which provides a transmission signal to either of the transducers through the analog switch is also connected to the positive input of a comparator 64, the negative input being connected to ground so that the comparator issues a positive output pulse whenever the clock input goes from negative to positive thereby serving as a zero crossing detector. A second comparator 66 has its positive input connected through the analog switch to the transducer A or B which is receiving acoustic signals. The outputs of the comparators 64 and 66 are connected to one shots 68 and 70, respectively, which in turn have their outputs connected by lines 72 and 74 to the set and reset inputs of a flip-flop 76. The time between the rising edges of the input signals to the flip-flop determine the pulse width of the flip-flop output on line 78 which is proportional to the difference in phase between the transmission signal input to the comparator 64 and the received signal input to the comparator 66. The flip-flop output on line 78 is fed to a three input AND gate 80. A second input of the AND gate is the count duration line 58 from the cycle counter and the third input is from a 10 MHz clock 82. Thus, the AND gate output will be a series of pulses at 10 MHz frequency in bursts lasting for the pulse width of the flip-flop 76 output, provided that the count duration signal is present. Thus, the number of pulses contained in each frequency burst from the AND gate is a measure of the phase difference between the transmission pulse and received pulse at the transducers.

As shown in FIG. 3, when the transducer pulses are in phase or at zero shift, the number of pulses output from the AND gate at each burst is zero and as the phase shift increases, the number of pulses increases until a phase shift of 360° is attained at which point a discontinuity occurs and the number of pulses drops to zero and again increases for phase shifts above 360°. Similarly, if the phase shift is in the other direction, that is, becomes less than zero, the number of pulses jumps to a high value and decreases as the phase shift further decreases from the zero point. Thus the number of pulses is a measure of phase difference and is directly proportional to phase shift only between 0° and 360°. A rollover circuit is used to indicate when such a discontinuity occurs and conditions the analyzing circuit and the microcomputer to properly interpret the discontinuity. A flip-flop 84 has its set input connected to the line 72 which is triggered by the transmission signal and its reset input connected to the line 74 which is triggered by the received signal. A second flip-flop 86 has inputs connected to the lines 72 and 74 so that it will toggle, that is, change state each time a pulse occurs on either input line. The outputs of the flip-flops are connected to an exclusive OR gate 88. When the transmission and received signals appear alternately during a continuous train of pulses, the flip-flop 84 and 86 will change state at the same time so that, for example, if both flip-flops are turned on and off simultaneously, their outputs are in phase and the exclusive OR 88 will have a low output. If, however, two transmission pulses occur in sequence without an intervening received pulse, the toggle flip-flop 88 will change state but the flip-flop 84 will not change state so that the flip-flop outputs will be out of phase and the exclusive OR will be turned on to produce a high output. The exclusive OR output occurs on line 90 and is termed a "roll over flag". The roll over occurs only when there is the discontinuity where the phase shift goes beyond zero or a multiple of 360° so that the roll over flag is used to aid the circuit in recognizing that event.

The circuit as thus far described is better explained with reference to FIG. 4. FIG. 4 is a series of waveforms illustrating the voltages occurring at the transducers A and B as shown on axes a and b, respectively, or they indicate the logic state or the number stored in various parts of the circuit at a given moment of time as depicted on axes c through g. FIG. 4 will be described in terms of a preferred embodiment having the 40 kHz transmission signal being provided in pulse trains of 256 pulses, but for purposes of clarity a fewer number of pulses in each train is depicted. This same type of compromise for the sake of drawing clarity is continued throughout the remainder of the axes in FIG. 4. In other words, the time scale is not strictly true, but the sequence of events occurring on the various axes illustrates the proper sequence of events in the circuit.

The square wave pulses 91 at axis b illustrate the transmission signal to the transducer B, which occurs when the analog switch is in the condition illustrated in FIG. 2. The 256 pulse train extends from time $t_1$ to $t_3$ which covers a period of about 6.25 milliseconds. At time $t_3$, the analog switch changes state and the transducer B is no longer fed from the clock 50, however, ringing in the transducer crystal creates large voltage signals 92 which gradually decay. The ringing signals can last for a long time. However, to dampen the ringing, a ring down logic circuit 94 (FIG. 2) is effective to connect a damping resistor 96 between the input of the comparator 66 and ground which in effect couples the damping resistor across the transducer which is set for receiving. The ring down logic circuit is controlled by the direction signal on line 56 and the ring down duration signal on line 62. The ring down duration is typically 16 cycles so that each time the acoustic signal direction changes, as noted by the direction signal on line 56, the ring down logic circuit is effective to place the resistor 96 across the receiving transducer for a period lasting for 16 pulses. This assures that the ringing signal 92 on the receiving transducer is quickly dissipated so that the ringing will not interfere with the sensing of the incoming acoustic pulses. After a new train of acoustic pulses from the other transducer arrives at the transducer B, small output signals 98 are produced at transducer B which gradually increase in magnitude as the sensor begins to resonate in harmony with the incoming signals. Thereafter, the sensor output stabilizes and continues at a fairly constant amplitude. Preferably, the transmission signal 91 driving the transducer is about 10 volts peak-to-peak. The received signal 100 reaches an amplitude of about 0.5 volts peak-to-peak and varies only in phase as caused by the effect of fluid flow changes on the acoustic signal propagation through the passage. Noise signals from extraneous sources can also cause some phase shifts in individual pulses.

To avoid taking any measurements during the beginning of each receiving period when the ringing 92 and the received pulse build up 98 is occurring, the circuit is conditioned to ignore any pulses occurring during the first 128 pulses of the transmission wave train and then readings are made of the received pulses during the remaining 128 pulses in the transmission wave. In FIG. 2, the count duration signal on line 58 has a low value during the first 128 pulses of each transmission period to assure that the AND gate 80 is disabled thereby inhibiting the reading of any data. The duration count changes to a high value at $t_4$ to allow reading of the phase difference between the transmission pulses from transducer A as shown on axis a and the received pulses from the output of transducer B. As previously described, the zero crossing point of the transmission and received pulses triggers the comparators 64 and 66 which in turn control the one shots and the flip-flop 76 to enable the AND gate for a period proportional to the phase differences shift during which the 10 MHz clock pulses pass through the AND gate. It will thus be seen that as shown in axes a and b of FIG. 4, that the transducers A and B alternate as acoustic sources and receivers and that the upstream and downstream propagation velocities determine the relative phases of the transmission and received pulses.

Returning to FIG. 2, a main up/down counter 102 has its input connected to the output of the AND gate 80 and further has control inputs from the roll over flag on line 90, from the direction signal on line 56, and the mode signal on line 60. The mode signal will be in one state from time $t_1$ through $t_5$ in FIG. 4 and in another state from time $t_5$ through $t_9$ where it reverts to the original state. A first mode state indicates that a measurement is being made to determine the difference of the upstream and downstream propagation times as revealed in the phase difference measurements. As shown on the axis c of FIG. 4, during the period between $t_2$ and $t_3$ the main up/down counter 102 cumulatively stores the pulses from the AND gate which occur during the upstream signal propagation thereby incrementing the count value until time $t_3$ whereupon the count remains unchanged until time $t_4$ when the readings for the downstream signal propagation occur and the incoming signals decrement from the cumulative upstream count. The final result occurring at time $t_5$ is A-B, a number representing the average upstream phase difference A minus the average downstream phase difference B, which value is taken to be proportional to the fluid flow velocity or fluid flow volume. At time $t_5$, that value A-B is shifted through a mode switch 104 controlled by the mode signal to a down counter 106 which counts down at an internally determined rate to trigger a T flip-flop 108 that produces an output pulse on output line 110 whenever the down counter reaches zero state. Then the down counter is caused to reload to the same number and repeat the down count to again trigger the flip-flop thereby producing a square wave signal as shown on axis d of FIG. 4 having a frequency varying inversely with the value A-B. That signal continues at the same frequency until a new value of A-B is derived from the main up/down counter 102. During the second mode of the circuit operation, beginning at time $t_5$, the circuit operates as before on the upstream propagation phase shift count, but during the downstream count, the phase difference values are added to the upsteam values so that at time $t_9$ the main up/down counter contains the value A+B which is indicative of the velocity of sound in the fluid. At time $t_9$, that value is shifted to a down counter 112 through the mode switch 104. That down counter decrements at a fixed rate and maintains a high output so long as the counter contains a number but switches to a low output whenever the counter reaches a zero state. Thus, a pulse 114 shown on axis e of FIG. 4 occurs on the counter output line 116 and the pulse width of the pulse 114 is proportional to the value A+B. The two lines 110 and 116 serve as outputs to the microcomputer 18 which utilizes the data for calculating the desired flow information.

The above description of the main up/down counter operation assumes that during the measurements the phase differences stayed in the region between zero and 360° so that no roll over occurred. If, however, such a roll over had occurred indicating that the phase difference during that period was very close to zero or 360°, then the roll over flag input to the main up/down counter by line 90 would set the counter output for the period to zero which would be very close to an accurate reading. This avoids the incongruity of averaging together high counts representing, say, 359° with low counts representing 1° to obtain some intermediate value representing perhaps 180°. By providing roll over information to the microcomputer which can track the history of the phase shift, there can be an accurate determination of the airflow even though it changes direction to enter the region of a negative phase shift or attains a high velocity which will cause a phase shift in excess of 360°.

There are many ways of outputting the measured data from the circuit. A second means for doing so comprises an up counter/shift register 118 having its input connected to the output of the AND gate 80 and having as its control inputs the direction signal on line 56, the mode signal on line 60, and the roll over flag on line 90. As shown on axes f and g of FIG. 4 during the measurement period beginning at $t_2$, the up counter/register 118 increments the upstream propagation count exactly as the main up/down counter had done and at time $t_3$ contains the upstream value A. At that point, under control of the direction signal on line 56, the circuit 118 outputs the stored signal unto line 120 as a 16 bit serial binary number. Additional information is sent with each serial output. The first bit of the serial pulse train is always a 1, the second bit is a 1 indicating the information is for the A direction or upstream propagation or it is 0 for downstream propagation. The remaining 14 bits are simply the binary content of the counter which represents the number A. At time $t_4$ for measurement during downstream propagation, the up counter/register 118 starts again at zero value and increments to time $t_5$ whereupon it contains the value B which is then output in serial form to the microcomputer 18. The values A and B are then added and subtracted as desired in the microcomputer.

As is well known, the difference in upstream and downstream propagation times (as represented by the difference of phase shifts) is proportional to the fluid velocity and then the microcomputer 18 is readily programmed to calculate that parameter as well as volume. To determine mass airflow the air density must also be known. Density is a function of air pressure and temperature. The sum of the phase shifts (A+B) is a measure of the velocity of sound in the air which in turn depends on temperature and humidity. In the preferred application to automotive engine control, it has been found that even the extremes of humidity changes in the atmosphere have a negligible effect on the velocity of sound and may be ignored. Thus, the sum of the phase shifts (A+B) is a useful measure of temperature for the density calculation. The pressure information is furnished by the pressure sensor 20. Accordingly, the microprocessor is able to accurately determine mass airflow.

For signal propagation in each direction through the flow passage, one phase measurement (comparing one pair of pulses) would result in a low resolution output value, whereas a large number of measurements when combined yield a high resolution. Thus, the preferred embodiment which cumulatively measures 128 phase differences in each direction has a high resolution. Decreasing the inhibit period and, consequently, increasing the measurement period inherently improves resolution without sacrificing response time. As more pulses are propagated in each direction, resolution can be increased but the reponse time increases—that is, more time will elapse between updated measurements in each direction. The integration of measurements by accumulating the individual phase shift values effectively filters noise from the received signal. This coupled with the rejection of nonresonant frequencies by the transducers results in a high signal-to-noise ratio even though relatively low voltage transmission signals are used.

It will thus be seen that this invention provides an acoustic fluid flow measuring method and apparatus useful to obtain fluid flow information at a fast response time and high resolution, and further that such information is obtained with low voltage excitation signals and resulting in a high signal-to-noise ratio.

The embodiments of the invention in which an exclusive property or privilege is claimed are defined as follows:

1. In an acoustic fluid flow meter having a flow passage and acoustic transducers mounted upstream and downstream respectively adjacent the passage and separated by an acoustic path length at least several times greater than the acoustic wavelength, the method of measuring fluid flow including the steps of:

energizing one of the transducers by a transmission signal to produce an acoustic pulse train continuing longer than the propagation time between the transducers to produce a received signal at the other transducer, measuring the cumulative phase differences between the transmission signal pulses and received signal pulses during a measurement period including many pulses beginning after the received signal has stabilized and continuing while the transmission signal is present, and alternating the roles of the transducers as sending and receiving transducers and repeating the phase difference measurements for both upstream and downstream acoustic signal propagation, whereby the difference between upstream and downstream phase differences is a function of fluid flow through the passage.

2. The method of measuring fluid flow as described in claim 1 including the steps of:

adding values representing the phase differences of many pairs of transmission and received pulses during signal propagation in one direction to produce a sum for a determined number of pulses, and subtracting from the sum values for the phase differences of an equal number of pairs of pulses during signal propagation in the other direction to produce a resultant representing the difference between upstream and downstream cumulative pulse differences.

3. The method of measuring fluid flow as described in claim 2 including the steps of adding values representing the phase differences of pairs of transmission and received pulses during signal propagation in one direction and then in the other direction to obtain a second resultant representing the sum of upstream and downstream phase differences, the second resultant being a measure of the velocity of sound in the fluid.

4. In an acoustic fluid flow meter having a flow passage and acoustic transducers having essentially the same resonant frequency mounted upstream and downstream respectively adjacent the passage and separated by an acoustic path length at least several times greater than the acoustic wavelength at resonance, the method of measuring fluid flow including the steps of:

energizing one of the transducers by a transmission signal having a frequency slightly different from the resonant frequency to produce an acoustic pulse train continuing longer than the propagation time between the transducers to drive the other transducer to a near resonant state producing a strong received signal, measuring the phase differences between the transmission signal and received signal during a measurement period beginning after the received signal has stabilized and continuing while the transmission signal is present, and alternating the roles of the transducers as sending and receiving transducers and repeating the phase difference measurements for both upstream and downstream acoustic signal progagation, whereby the difference between upstream and downstream phase differences is a function of fluid flow through the passage.

5. In an acoustic fluid flow meter having a flow passage and acoustic transducers having essentially the same resonant frequency mounted upstream and downstream respectively adjacent the passage and separated by an acoustic path length at least several times greater than the acoustic wavelength at resonance, the method of measuring fluid flow including the steps of:

energizing one of the transducers by a transmission signal having a frequency slightly different from the resonant frequency to produce an acoustic pulse train continuing longer than the propagation time between the transducers to drive the other transducers to a near resonant state producing a strong received signal of the pulse train frequency and filtering out spurious signals that are not near the resonant frequency, measuring the phase difference pulse by pulse between the transmission signal and received signal and accumulating the phase difference measurements during a measurement period beginning after the received signal has stabilized and continuing while the transmission signal is present, thereby filtering out noise and producing high resolution, and alternating the roles of the transducers as sending and receiving transducers and repeating the phase difference measurements for both upstream and downstream acoustic signal propagation, whereby the difference between upstream and downstream phase difference is a function of fluid flow through the passage.

6. In an acoustic fluid flow meter having a flow passage and acoustic transducers having essentially the same resonant frequency mounted upstream and downstream respectively adjacent the passage and separated by an acoustic path length at least several times greater than the acoustic wavelength at resonance, the method of measuring fluid flow including the steps of:

energizing one of the transducers by a transmission signal having a frequency slightly different from resonant frequency to produce an acoustic pulse train continuing longer than the propagation time between the transducers to drive the other transducer to a near resonant state producing a strong received signal, alternating the upstream and downstream transducers as sending and receiving transducers whereby the receiving transducers are subject to ringing for a period following transmission and during the initial portion of a receiving mode and then gradually begin to resonate with the received pulse train, inhibiting the measurement of signals from the receiving transducer until after ringing subsides and resonant received signals are stabilized, and then for both upstream and downstream acoustic signal propagation measuring the phase differences between the transmission signal and received signal after the received signal has stabilized and continuing while the transmission signal is present, whereby the difference between upstream and downstream phase differences is a function of fluid flow through the passage.

7. In a mass airflow meter having a flow passage, and an air pressure sensor, and acoustic transducers having essentially the same resonant frequency mounted upstream and downstream respectively adjacent the passage and separated by an acoustic path length at least several times greater than the acoustic wavelength at resonance, the method of measuring mass airflow including the steps of:

generating a pressure signal representing air pressure, energizing one of the transducers by a transmission signal having a frequency slightly different from the resonant frequency to produce an acoustic pulse train continuing longer than the propagation time between the transducers to drive the other transducer to a near resonant state producing a strong received signal, measuring the phase difference between the transmission signal and received signal during a measurement period beginning after the received signal has stabilized and continuing while the transmission signal is present, alternating the roles of the transducers as sending and receiving transducers and repeating the phase difference measurements for both upstream and downstream acoustic signal propagation, whereby the difference and sum of the upstream and downstream phase differences are functions of air velocity and temperature respectively, and calculating mass airflow from the measured phase difference values and the pressure signal.

8. An acoustic fluid flow meter for measuring the flow through a passage comprising a pair of acoustic transducers having essentially the same resonance frequency mounted upstream and downstream adjacent the flow passage for alternately sending acoustic energy through the passage from one to the other, the acoustic propagation path length being at least several times greater than the wavelength of the propagated energy, a high frequency voltage source for supplying a transmission signal comprising a train of transmission pulses to either of the transducers at a frequency slightly different from the transducer resonant frequency to drive the other transducer at a near resonant state to produce a train of received pulses, switching means for alternately coupling the transmission signal to the transducers to energize each transducer in turn for a transmission period much longer than the propagation time between the transducers, and the other transducer serving as a receiver to output received signals and being subject to initially unstable operation at the beginning of each period, means effective in each period after the receiver transducer is stabilized for measuring the phase difference between the transmission and received signals thereby obtaining phase difference values for upstream and downstream propagation whereby the difference of the upstream and downstream phase difference values is a measure of fluid flow.

9. A flow meter as claimed in claim 8 wherein the means for measuring the phase difference includes means for measuring the phase differences between each transmission pulse and a corresponding received pulse, and means for cumulatively storing the measured phase difference to determine a phase difference value for each period.

10. A fluid flow meter as described in claim 9 wherein the fluid is air for measuring mass airflow including, an air pressure sensor for supplying a pressure signal, and computer means programmed to process the pressure signal and the phase difference values to obtain a value representing mass airflow.

11. A flow meter as claimed in claim 8 wherein the means for measuring the phase difference includes means for measuring the phase difference between each transmission pulse and a corresponding received pulse, and means for cumulatively storing the measured phase differences over two consecutive periods in a manner to subtract downstream propagation values from upstream propagation values to obtain a difference of phase difference values representing fluid flow.

* * * * *